(12) United States Patent
Qian et al.

(10) Patent No.: US 7,570,649 B2
(45) Date of Patent: Aug. 4, 2009

(54) FORWARDING STATE SHARING BETWEEN MULTIPLE TRAFFIC PATHS IN A COMMUNICATION NETWORK

(75) Inventors: Lie Qian, Richardson, TX (US); Yiyan Tang, Richardson, TX (US); Yuke Wang, Richardson, TX (US); Bashar Bou-Dlab, Ottawa (CA); Wladyslaw Olesinski, Ottawa (CA)

(73) Assignee: Alcatel Lucent, Paris (FR)

( * ) Notice: Subject to any disclaimer, the term of this patent is extended or adjusted under 35 U.S.C. 154(b) by 790 days.

(21) Appl. No.: 11/067,506

(22) Filed: Feb. 28, 2005

(65) Prior Publication Data

US 2006/0193332 A1    Aug. 31, 2006

(51) Int. Cl.
H04L 12/28    (2006.01)
H04L 12/56    (2006.01)

(52) U.S. Cl. .................. 370/400; 370/389; 370/351

(58) Field of Classification Search ........... None
See application file for complete search history.

(56) References Cited

U.S. PATENT DOCUMENTS

| | | | |
|---|---|---|---|
| 6,728,777 B1 * | 4/2004 | Lee et al. ................. | 709/238 |
| 6,735,190 B1 * | 5/2004 | Chuah et al. ............. | 370/352 |
| 7,373,401 B1 * | 5/2008 | Azad ........................ | 709/224 |
| 2002/0126671 A1 * | 9/2002 | Ellis et al. ................ | 370/390 |
| 2002/0169833 A1 * | 11/2002 | Tani et al. ................ | 709/205 |
| 2004/0264462 A1 * | 12/2004 | Bardalai et al. .......... | 370/390 |
| 2005/0169266 A1 * | 8/2005 | Aggarwal et al. ......... | 370/389 |
| 2006/0147204 A1 * | 7/2006 | Yasukawa et al. ......... | 398/26 |

* cited by examiner

*Primary Examiner*—Edan Orgad
*Assistant Examiner*—Sori A Aga

(57) ABSTRACT

The sharing of forwarding states between multiple traffic paths is described. There is described a method for establishing a data traffic path in a communication network from a first node towards a second node. The method includes searching a set of pre-existing forwarding states for a pre-existing forwarding state associated with the first node for defining the traffic path from the first node towards the second node. If the pre-existing forwarding state for defining the traffic path cannot be found in the set of pre-existing forwarding states, then a new forwarding state for defining the traffic path from the first node towards the second node is generated the new forwarding state is used to establish the traffic path from the first node towards the second node. An apparatus implementing the method is described. The sharing of forwarding states as described may be used in MPLS enabled networks.

19 Claims, 11 Drawing Sheets

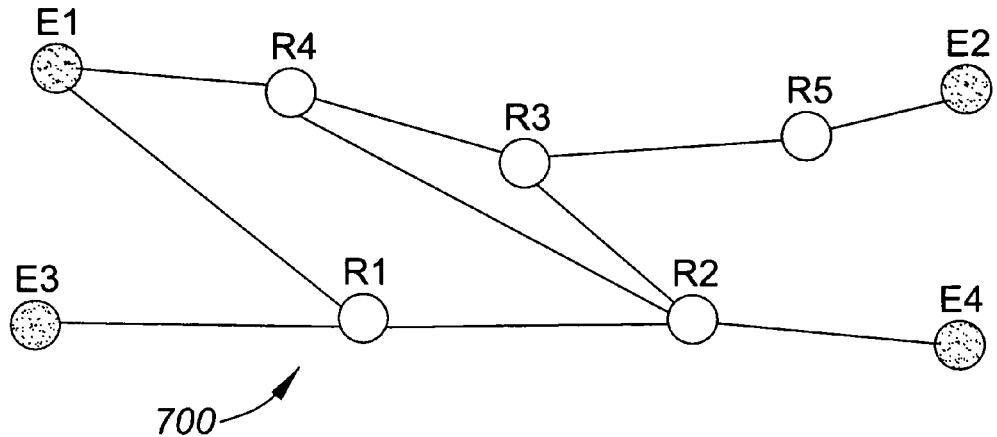

30 STATIC TUNNELING LSPs $LSP_{E1-E2}$: E1->R4->R3->R5->E2

$LSP_{E1-R3}$: E1->R4->R3

$LSP_{E1-R4}$: E1->R4

$LSP_{E1-E4}$: E1->R4->R2->E4
　　　　　　E1->R1->R2->E4

$LSP_{E1-R2}$: E1->R4->R2
　　　　　　E1->R1->R2

$LSP_{E1-E3}$: E1->R1->E3

$LSP_{E1-R1}$: E1->R1

$LSP_{E2-E1}$: E2->R5->R3->R4->E1

$LSP_{E2-R4}$: E2->R5->R3->R4

$LSP_{E2-R3}$: E2->R5->R3

$LSP_{E2-E3}$: E2->R5->R3->R2->R1->E3

$LSP_{E2-R1}$: E2->R5->R3->R2->R1

$LSP_{E2-R1}$: E2->R5->R3->R2

$LSP_{E2-E2}$: E2->R5->R3->R2

$LSP_{E3-E1}$: E3->R1->E1

$LSP_{E3-R1}$: E3->R1

$LSP_{E3-E4}$: E3->R1->R2->E4

$LSP_{E3-R2}$: E3->R1->R2

$LSP_{E3-E2}$: E3->R1->R2->R3->R5->E2

$LSP_{E3-R3}$: E3->R1->R2->R3

$LSP_{E4-E2}$: E4->R2->R3->R5->E2

$LSP_{E4-R3}$: E4->R2->R3

$LSP_{E4-E1}$: E4->R2->R4->E1
　　　　　　: E4->R2->R1->E1

$LSP_{E4-R4}$: E4->R2->R4

$LSP_{E4-R2}$: E4->R2

$LSP_{E4-E3}$: E4->R2->R1->E3

$LSP_{E4-R1}$: E4->R2->R1

FIG. 7

FORWARDING STATE SHARING BETWEEN MULTIPLE TRAFFIC PATHS IN A COMMUNICATION NETWORK

FIELD OF INVENTION

The invention relates to the art of communication systems and more specifically to an implementation of forwarding state sharing between multiple paths in a communication network.

BACKGROUND OF THE INVENTION

In a communication system, resources are typically used to establish and maintain communication paths through which data may be forwarded. At each node or network element along a communication path, the forwarding state of data, such as a packet of digital data, may be determined to forward the packet along to the next node, or next hop, of the communication path. Thus, forwarding state may be considered the information used at each node to forward the data to the next node.

In an installation of a communication network system, there can be Internet Protocol (IP) and Multiprotocol Label Switching (MPLS) controls for forwarding data packets through the network. MPLS is considered by some as an efficient way of transmitting data packets. This is primarily because MPLS eliminates the need to examine the destination IP address of a packet at every router or network node in the path of the packet. As such, MPLS has particular utility in the high speed core of many networks, such as IP networks.

For instance, the IP control may comprise IP routing protocols such as OSPF, IS-IS, and BGP, which exchange network topology information and help build the IP forwarding state. MPLS control may comprise signalling protocols such as LDP, RSVP-TE, and BGP to communicate forwarding state information between nodes. The IP forwarding state is thus constructed using the destination IP address. With an MPLS implementation, each incoming packet is provided with a MPLS "label", and thereafter an MPLS node examines the "label" instead of the destination IP address to make a forwarding decision. Thus, the forwarding state at a MPLS node may be used to establish a data traffic path through which data may be communicated. A MPLS node, such as a label-switching router (LSR), may use information provided by the IP and MPLS control components to construct the MPLS forwarding state at the node to establish a communication path and forward a data packet to the downstream node, or child node, along a label switched path (LSP). MPLS thus reduces the need to perform a complex route lookup based on destination IP address and provides a switched logical path LSP facility.

Prior to transmission of data packets through a network, data traffic paths are established between nodes for transport of such packets. In a MPLS implementation, separate label-switched paths (LSP's) may be provided for packets of different forwarding equivalence classes (FEC's) of a MPLS implementation, such as different classes of service, passing through a node or LSR. The establishment of separate traffic paths or LSPs require network administration resources which may be scarce. Particularly in an MPLS implementation, since a 32 bit MPLS shim label only provides for a 20-bit label identifier, there are only $2^{20}$ unique labels (or 64,000 unique labels) available to a MPLS network domain. As each LSP requires the use of one or more unique labels at each LSR, the number of LSPs that may be deployed in a MPLS network is limited by the 64,000 unique labels that are available.

The issue of exhausting network administration resources may be compounded in prior art networks where multicast messages are being forwarded therethrough in one or more multicast channels. For instance, in a single multicast channel for forwarding data to multiple destination nodes in a MPLS network, a "multicast tree" may be constructed with LSPs providing different paths in the multicast tree trough the nodes, or LSRs. For instance, the multicast tree may have destination nodes as leaves, and the source node as the root in case of single source multicast. In case of multiple sources, a "rendezvous" node may be used as the root node. As such, in MPLS terminology each node or LSR on a multicast tree may be categorized into 1) a Source Designated Router (SDR) or root node, 2) a Branching Router (BR), which has more than one child router on the multicast tree, 3) a Non-branching Router (NBR), which has only one child router on the multicast tree, and 4) a Destination Designated Router (DDR), which is a leaf on the multicast tree. Each LSR, be it a SDR, BR, NBR or DDR along the multicast tree is typically required to maintain a roster of information relating to a forwarding state as part of each multicast channel or multicast tree that passes through the LSR. Thus, in an MPLS implementation, MPLS labels are consumed at each LSR for every multicast channel that is forwarding data through the network. For networks in which multiple multicast channels are provided, it is evident that the available network administration resources, such as unique MPLS labels in a MPLS network, may be exhausted even more quickly, and that the deployment scale of the network is limited by the consumption of resources.

As such, there is a need for a method and system that seeks to alleviate the above disadvantages.

SUMMARY OF THE INVENTION

In an aspect of the present invention, there is a provided a method for establishing a data traffic path in a communication network from a first node towards a second node. The method comprises: searching a set of pre-existing forwarding states for a pre-existing forwarding state associated with the first node for defining the traffic path from the first node towards the second node; and if the pre-existing forwarding state for defining the traffic path cannot be found in the set of pre-existing forwarding states, generating a new forwarding state for defining the traffic path from the first node towards the second node; and using the new forwarding state to establish the traffic path from the first node towards the second node.

The method may further comprise the step of: if the pre-existing forwarding state for defining the traffic path is found in the set of pre-existing forwarding states, then establishing the traffic path using the pre-existing forwarding state.

The step of if the pre-existing forwarding state for defining the traffic path cannot be found in the set of pre-existing forwarding states may further comprise adding the new forwarding state to the set of pre-existing forwarding states associated with the first node.

The new forwarding state may includes information identifying the second node. The set of pre-existing forwarding states may be stored in a table of records associated with the first node, and the new forwarding state may be stored as a record in the table.

The traffic path may be a segment of a multicast tree for a multicast channel in the communication network, and the second node may be a branching node of the multicast tree.

The communication network may be MPLS enabled and the new forwarding state may include a MPLS label.

The number of traffic paths defined towards the second node from the first node may be recorded in the table of records. The number of traffic paths defined towards the second node may be incremented upon the new forwarding state being generated.

In another aspect of the present invention, there is provided a method for responding to a first request for establishing a first traffic path through a first node towards a second node, and for responding to a second request establishing a second traffic path through the first node towards the second node. The method comprises: receiving the first and second requests at the first node; generating a forwarding state identifying the second node, the forwarding state being for defining the first and second traffic paths through the first node towards the second node; associating the forwarding state with the first and second traffic paths; and establishing the first and second traffic paths through the first node towards the second node according to the forwarding state.

The forwarding state may be stored in a table of records associated with the first node.

The first traffic path may be a segment of a first multicast tree for a first multicast channel in the communication network. The second traffic path may be a segment of a second multi-cast tree for a second multicast channel in the communication network. The second node may be a branching node or a destination designated node of the first multicast tree. The second node may be a branching node or a destination designated node of the second multicast tree.

The communication network may be a MPLS enabled network. The forwarding state may include an ingress MPLS label, an egress MPLS label, an egress interface identifier, and a further identifier associating the forwarding state with the second node.

The step of generating the forwarding state may be performed after receiving the first request to establish the first traffic path at the first node. The step of generating the forwarding state may also be performed prior to receiving the first request to establish the first traffic path at the first node.

The first and second multicast channels may be each associated with the transmission of multimedia data.

In another aspect of the present invention, there is provided a network element for establishing a data traffic path in a communications network from the network element towards a second network element. The network element comprises: data storage associated with the network element for storing a set of pre-existing forwarding states; and an egress interface for forwarding the data for the traffic path from the network element towards the second network element. As a request is received at the network element to establish the traffic path, the set of pre-existing forwarding states is searched for a pre-existing forwarding state for defining the traffic path from the egress interface toward the second network element. If the pre-existing forwarding state for defining the traffic path cannot be found in the set of pre-existing forwarding states, then: generating a new forwarding state for defining the traffic path through the egress interface towards the second network element; storing the new forwarding state into the set of pre-existing forwarding states; and using the new forwarding state to establish the traffic path from the egress interface towards the second network element through the egress interface.

The communication network may be MPLS enabled, and the new forwarding state may include an ingress MPLS label, an egress MPLS label, an egress interface identifier identifying the egress interface, and an identifier associated with second network element. The traffic path may be associated with a multicast channel.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 7 is a block diagram of nodes of a multicast tree in which traffic tunnels may be statically established in yet another embodiment of the present invention.

DETAILED DESCRIPTION OF AN EMBODIMENT

Figure 1:
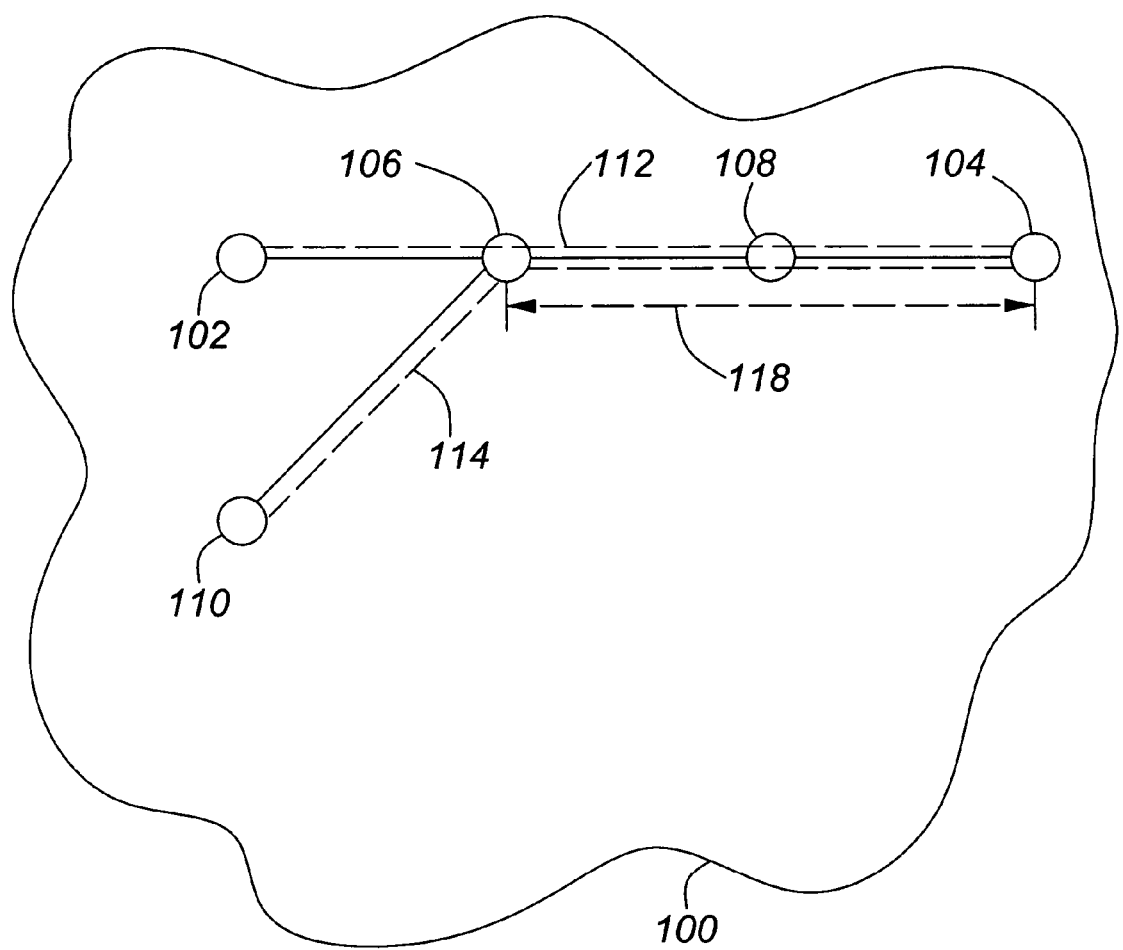
FIG. 1 is a block diagram of a computer communication network.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

In an embodiment, there is a communication network for forwarding data from one node to another along data traffic paths in the network. Referring to FIG. 1, there is shown a network 100. Therein, nodes 102, 104, 106, 108 and 110 are interconnected by communication links, shown as the solid lines connecting the nodes. It will be appreciated that network 100 may have other nodes that may be connected to one another, and to nodes 102, 104, 106, 108 and 110. However, only nodes 102, 104, 106, 108 and 110, and the shown communication links, are presently considered with respect to network 100.

Assuming that initially there is no information regarding forwarding states that define data traffic paths in network 100. A communication or traffic path may be established by providing a first node with a request for a path towards a second node. The request may be generated at the first node in response to a desire to forward data to the second node, or be received externally from the first node from another element within or outside network 100. For instance, if a request is received at node 102 to establish a communication path towards node 104, a path 112 (shown in dashed line) may be defined by way of forwarding states that are locally relevant to each of nodes 102, 106, and 108 for identifying traffic path 112 towards destination node 104. Thus, after receipt of a request to define a path towards node 104, a forwarding state locally relevant to node 102 may be generated for path 112 through the link between node 102 and node 106 towards node 104. It will be appreciated that this link may be any link provided by any network layer of network 100. This forwarding state generated at node 102 may be identified as being associated with destination node 104, and may also be stored so that it is accessible by node 102 for sharing with traffic paths other than path 112. It will be appreciated that this generation and storage of a forwarding state may be local to node 102, or be by another element within or without network 100. A request to establish a path to destination node 104 may then be passed to the next hop, or node, toward node 104, which as shown in FIG. 1 is node 106 and then subsequently node 108. At nodes 106 and 108, the same process as at node 102 is repeated for generating forwarding states that are locally relevant to each of nodes 106 and 108 to establish traffic path 112 towards destination node 104. The generated forwarding states at nodes 106 and 108 are associated with the destination node 104 and may also be stored of sharing with other traffic paths as in the case of node 102. Thus, it will be appreciated that forwarding path 112 may be established and defined by the forwarding states generated at each node 102, 106 and 108, which forwarding states are all associated with a particular destination node (i.e., node 104 in this example).

After the forwarding states at nodes 102, 106 and 108 is generated as above, if a request is then received at node 102 for establishing another path to destination of node 104, there is no longer a need to create entirely new forwarding state information to generate the new path to destination node 104. Node 102 may now search its available set of forwarding states, and find that it already has a forwarding state associated with a traffic path 112 to node 104 as the destination. Thus, the newly requested traffic path may be defined using the forwarding state already available to node 104. Furthermore, a request to define the new path need not be forwarded to node 106 or 108, since the downstream forwarding states may also be shared.

If a traffic path is desired between nodes 110 and 104, there will initially be no forwarding state information at node 110 that is associated with destination node 104. As such, a forwarding state is generated for node 110 to establish a path 114 towards node 104, such as, for example, through the link between nodes 110 and 106. Like at node 102 when there was initially no forwarding state information, a request to establish a path towards node 104 is sent from node 110 to node 106. Now, however, since node 106 already has a stored forwarding state associated with destination node 104, instead of generating a new forwarding state in response to the path request from node 110, the stored forwarding state associated with destination node 104 may be shared and used to define traffic path 114 towards node 104. Thus, path 114 from node 110 to node 104 may be defined with only new forwarding state information generated at node 110, but for which generation of new forwarding states at intermediate nodes 106 and 108 are avoided since the pre-existing forwarding states that are available in connection with path 112 may be shared with path 114, which paths both have a common destination point.

It will be appreciated that forwarding paths 112 and 114 both pass through a common segment, or tunnel shown as 118 in the common sections of paths 112 and 114 in which forwarding states are shared.

Figure 2:
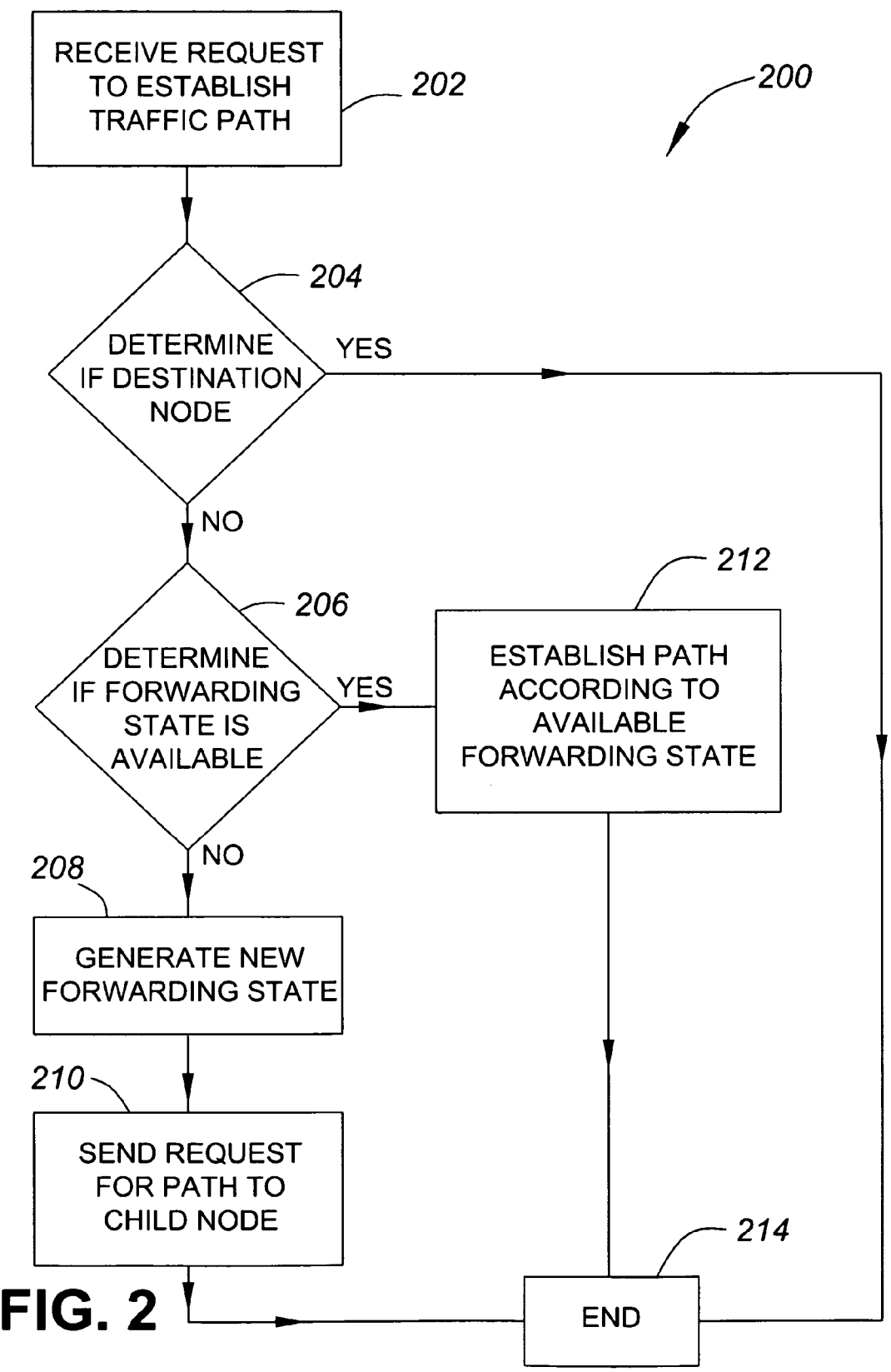
FIG. 2 is a flow chart diagram of a method for establishing a path towards a destination node in the computer network of FIG. 1.

In an embodiment, the processing at each node establishing a traffic path from a first node towards a second, or destination, a node in network 100 may be shown pictorially as a flow chart 200 in FIG. 2. At each node towards a destination node, the path establishment process begins at step 202 with the receipt of a request to establish a traffic path towards a destination node, which in the case of the first, or start, node of a path, the request may be generated internally in response to establish a path towards the second, or destination, node as described above. At step 204, if the node under consideration is found to be the destination node, then the path establishment process is terminated at step 214, since forwarding states at nodes along the desired traffic path must then have been generated. However, if the node is not the destination node, then the process continues to step 206 at which it is determined if there is a suitable forwarding state identifying the destination node that is available to the node under consideration. If so, then at step 212 a path is established towards the destination node using the available forwarding state. However, if at step 206 no suitable forwarding state is found, then at step 208 a new forwarding state is generated to establish a path towards the destination node. It will be appreciated that step 206 may include communication with a network information management system, or communication with the next node towards the destination node, to generate and optionally store the forwarding state. Then at step 210, a request to establish a path towards the destination node is sent to the next node towards the destination node, after which processing of the path establishment request at the node under consideration terminates at step 214.

It will be appreciated that in some embodiments, forwarding states may not be shared among traffic paths even if such paths share a common segment towards a common destination node. For instance, data traffic paths in a communication network may each be associated with a particular class of service, for which each respective class of service may have certain quality of service (QoS) requirements. For example, during traffic path setup and definition, reservations of network resources are made to provide the QoS requested by the path, and such a path may be defined such that its bandwidth is not sharable. As such, it may be inappropriate to share forwarding states between traffic paths having different QoS requirements. While it may be possible to share forwarding states within an acceptable range of QoS differences between traffic paths, the acceptable difference thresholds may vary in different network implementations. The management of sharing available forwarding states may be handled by different techniques in different implementations, such as by intelligence at each network node (such as by the performance of a QoS check between steps 206 and 212 of FIG. 2 described above), or by a network information management system.

More specific details regarding implementations and applications of the above described forwarding states sharing method between data traffic paths is now provided with respect to embodiments in which MPLS forwarding is provided in a communications network.

In conventional IP forwarding in a network, each router, which may be considered a network node, typically independently examines a data packet received thereat and assigns the packet to a forwarding path, which may be a "forward equivalency class" (FEC). In contrast, in MPLS a packet is assigned to a FEC only once as the packet enters an MPLS domain, and a "label" representing the FEC is attached to the packet. A FEC may be considered a transmission channel through which packets are transmitted, and may be unicast (point-to-point) or multicast (point-to-multipoint). At subsequent node hops along a forwarding path within an MPLS domain, the IP information of the packet is no longer examined. Instead, the MPLS label provides an index into a table, commonly referred to as a MPLS label switching table, which specifies the next hop, and a new label. Such a forwarding path are known in the art as a label switched path (LSP), and a LSP may be manually set up as permanent label switched paths (PLSP) by network operators in static operation, whereby some or all of the LSPs of a network is pre-determined. Alternatively, a label distribution protocol (LDP) may be employed wherein the network dynamically sets up LSPs upon command(s) from the network operator or a packet arriving at a node without a forwarding path on which the packet can be forwarded to its destination. Such paths are typically referred to in the art as soft-permanent or signalled LSPs (SLSPs). Further details concerning MPLS can be found in the following draft (i.e. work in progress) MPLS standards or proposals, each of which is incorporated herein by reference:

[1] E. Rosen, A. Viswanathan, R. Callon, Multiprotocol Label Switching Architecture, draft ietf-mpls-arch-06.txt.

[2] L. Andersson, P. Doolan, N. Feldman, A. Fredette, B. Thomas, LDP Specification, draft-ietf-mpls-ldp-06.txt.

[3] B. Davie, J. Lawrence, K. McCloghrie, Y. Rekhter, E. Rosen, G. Swallow, P. Doolan, MPLS Using LDP and ATM VC Switching, draft-ietf-mpls-atm-02.txt.

[4] B. Jamoussi, Constraint-Based LSP Setup using LDP, draft ietf-mpls-cr-ldp-0.1.txt.

[5] E. Braden et al., Resource Reservation Protocol, RFC 2205. This LDP implementation is hereinafter also referred to as "RSVP".

Figure 3:
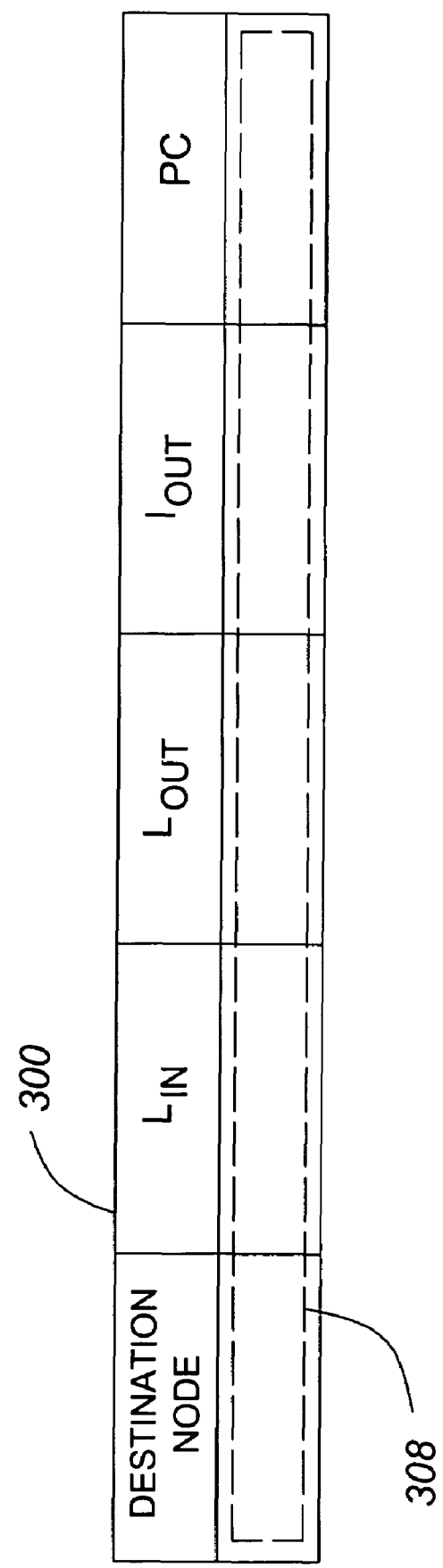
FIG. 3 is a diagram of a table of forwarding states employed by a node for establishing traffic paths in an embodiment of the present invention.

In an embodiment, forwarding state sharing may be implemented by maintaining information in addition to the label and interface information of a MPLS label switching table. Such additional information may be arranged along with label switching information into a table or records, and may be referred to as a "tunnelling information". A tunnelling record table may be implemented for each node, or LSR. An exemplary tunnelling record table may be pictorially represented as table 300 of FIG. 3, which may be used for maintaining information relating to traffic paths, or LSPs, that pass through the LSR. In table 300, each entry 308 in the table specifies forwarding state information that may define a traffic path or be shared among traffic paths. For example, entry 308 may specify an ingress label $L_{in}$, and one or multiple parts of egress label $L_{out}$ and an output interface $I_{out}$. $I_{out}$ specifies an egress interface from the LSR. Where an entry 308 in table 300 provides more than a single pair of $L_{out}$ and $I_{out}$ information, the entry may be used in a branching node of a multicast channel in which packets are duplicated and sent out from the LSR from a different egress interface with the egress label $L_{out}$ specified for that egress interface $I_{out}$. For ease of illustration, consideration of only non-branching nodes or LSRs, that is, an entry such as entry 308 that provides only a single pair of ($L_{out}$, $I_{out}$) information, is presently considered. While point-to-multipoint LSPs are not considered in detail, it will be appreciated that the same principles may be applied to point-to-multipoint LSPs, as described in greater detail below.

A LSR may have multiple ingress and egress interfaces for connection to multiple neighbour LSRs. A tunnelling record table, such as table 300, may be associated with a LSR or with an interface of the LSR, or only label switching information in separate label switching tables may be associated with each interface of the LSR and LSP information for sharing forwarding states may be recorded in a centralized tunnelling record table for the LSR. As described in greater detail below, implementing forwarding state sharing for a network node, or LSR, that has separate tunnelling record tables for each ingress interface may require usage of more MPLS labels in an embodiment.

For the embodiment, data traffic paths or LSPs may be established by way of entries that are generated in tunnelling record tables along node towards the destination node. The label information in each entry may identify a communication path because, during data routing when a packet of data arrives at a LSR, the LSR searches a tunnelling record table, such as table 300, for an entry with ingress label $L_{in}$ that matches the label on the packet, for example by way of 20-bit fixed length matching of the MPLS header in the 32 bit shim header of a MPLS enabled packet. For each pair of $L_{out}$ and $I_{out}$ information in a matched entry, the LSR swaps the label value $L_{in}$ of the packet with the table in the $L_{out}$ field of the entry, and forwards the packet to a neighbour LSR through egress interface $I_{out}$. This process may be referred to as "label switching" of a packet, which forwards a packet through a MPLS network by way of a LSP defined by the forwarding state information in a tunnelling record table of each LSR along the traffic path of a packet. Thus, an entry including $L_{in}$ and ($L_{out}$, $I_{out}$) associated with a LSR in a tunnelling record table, such as table 300, may be used to identify a traffic path, or a LSP, that passes through the LSR. As such, the generation of forwarding states in a tunnelling record table of a LSR is also the creation of LSPs through that LSR, and for each LSR, since each entry in the table is also associated with a destination node, the entry is therefore also associated with a LSR. One of skill in this art will appreciate that MPLS label switching tables may be used to maintain information regarding traffic paths in a MPLS domain, and that a tunnelling record table, such as table 300, may contain the typical information of a MPLS label switching table, but also contains additional information to enable forwarding state sharing. It will be appreciated that although table 300 as described includes information similar to a MPLS label switching table, in other embodiments a separate MPLS label switching table used strictly for label switching may be maintained in addition to a tunnelling record table, or the tables be merged like table 300, as would be apparent to one of skill in this art.

For an embodiment, each record of table 300 also maintains a field "pathcount", shown as "PC" in the figures, that sets out the number of traffic paths that utilize the forwarding state information maintained in that record. As each record of table 300 is generated in response to a path setup request, the value of pathcount is set to "1", and this value is incremented as additional paths are defined to share the downstream forwarding state information of the record, as described in greater detail below.

As described, in an embodiment each entry in table 300 further includes information associated with the target, or destination node of the LSP associated with entry 308. This target or destination node information is provided to an MPLS domain in a path establishment request, and may be provided to a node or LSR in the MPLS network. Furthermore, the information may be used to generate traffic paths that provide a "tunnelled" section with shared forwarding state towards a common destination node of different communication paths.

Figure 4A:
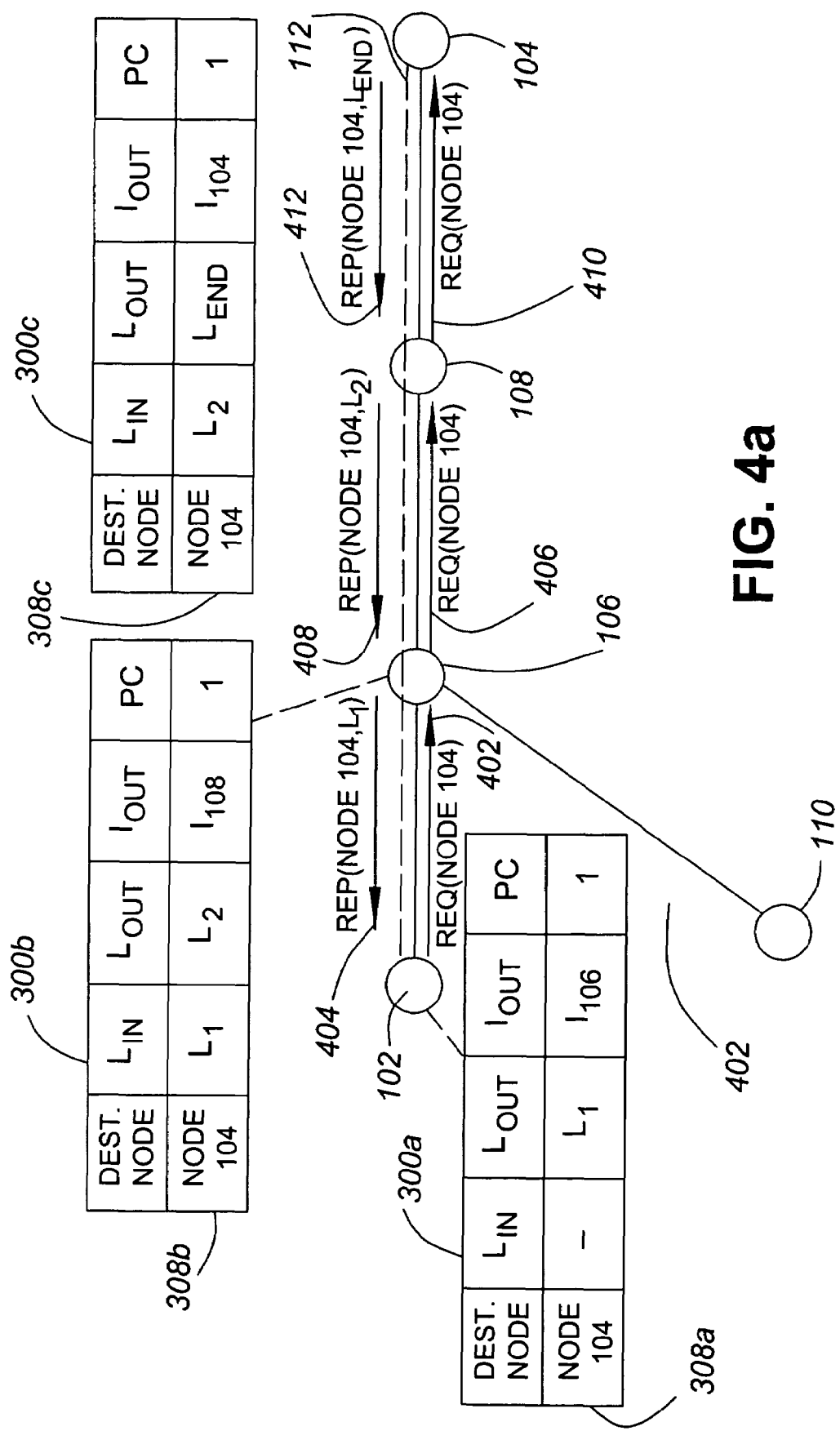
FIG. 4a to 4c are block diagrams showing an establishment of traffic paths towards a destination node employing the method of FIG. 2 and an implementation of the table of FIG. 3.

For instance, given a node in a network, such as node 102 in network 100, an exemplary method for establishing a communication path 112 towards node 104 with forwarding state sharing capability may be established along nodes 106 and 108. Referring to FIG. 4a, nodes 102, 106 and 108 are each respectively associated with tunnelling record tables 300a, 300b and 300c each having MPLS label switching information and LSP tunnelling information.

To establish a path from node 102 to node 104, node 102 first checks its associated table 300a to see if there is any previously established LSP passing through or originating from node 102 with its end point at node 104. This determination may be by determining if there are any entries in table 300a that has target node information that matches node 104. Assuming that no such entry is found in table 300a, then node 102 finds a "child" node, or the next downstream node, at its next hop towards node 104 through any technique known in the art, such as consulting an IP routing database or as instructed by a network information management system (not shown) of network 100 for the purpose of constrained path routing. The next hop node may also be determined by node 102 with the address of the destination node 104 using a routing scheme known to a person of skill in this art. After the next hop node is determined, node 102 then sends a request 402 to establish a traffic path, denoted by Req(node 104), to the child node 106. Information identifying node 104, such as the network address of node 104, is carried in request 402 sent to node 106.

When a node 106 receives request 402 from node 102, node 106 also checks its table 300b to determine if there is any previously established LSP passing through or originating form node 106 with its end point at node 104, in the same manner as already discussed with reference to node 102. Assume again that if node 106 does not find any existing LSP that ends at node 104 in its table 300b, then node 106 selects an unused MPLS label $L_1$ and sends a reply 404 to parent node 102. Reply 404 may be in the format of Rep(node 104, $L_1$), wherein the destination node and selected label $L_1$ are provided back to node 102. It will be appreciated that request 402 and reply 404 may include other information (not shown), such as indicators for a requested quality of service for the traffic path being defined.

A new entry 308b is created in tunnelling record table 300b for node 106 for the new LSP with a target node of node 104, and ingress label $L_1$. The egress label-interface pair in this new entry 308b of table 300b is temporarily left as unset. Upon receiving reply 404, an entry 308a in table 300a is also created for node 102 with information identifying node 104 in its target node field, and with $L_{out}$ field set to label $L_1$ and $I_{out}$ set to a value that selects an egress link from node 102 towards node 106, such as $I_{106}$. The value of $L_{in}$ of entries in table 300a may depend on whether node 102 is an edge node in the MPLS domain. If it is an edge node, then $L_{in}$ is irrelevant since packets received at node 102 will arrive without MPLS labels, and hence label $L_1$ will be the first label attached to packets entering the MPLS domain through node 102 as label $L_1$ is pushed onto a memory stack to replace the routing information that was previously associated with the packets, such as IP destination addresses. However, if node 102 is not an edge node in the MPLS domain, then $L_{in}$ may be a label that identified node 102 as next-in-line for receiving data packets.

Node 106 further sends a request 406, shown as Req(node 104), to the next LSR on its next hop toward node 104, that is, towards node 108. At node 108, the same process as at node 106 is repeated, and assuming again that a entry for a pre-existing LSR terminating at node 104 is not found in table 300c associated with node 108, then an entry 308c is created in table 300c for establishing the new LSR. For instance, an MPLS label, $L_2$, may then be selected for use with the new LSR at node 108, and $L_2$ is placed into the ingress label field of entry 308c along with information identifying node 104 as the target node of entry 308c. A response 408, shown as rep(node 104, $L_2$), is also provided to node 106, Upon node 106 receiving response 408, entry 308b of table 300b is updated with the egress label set to $L_2$, and egress link field $I_{out}$ set to select an egress link from node 106 to node 108.

Node 108 further sends a request 410, shown as Req(node 104), to the next LSR, which in this case is the destination node 104. At node 104, a further MPLS label $L_{end}$ is selected and sent with a response 412, shown as Rep(node 104, $L_{end}$), to node 108. Entry 308c of table 300c is then updated to have the egress label field $L_{out}$ set to $L_{end}$, and egress interface field $I_{out}$ is set to select an egress link from node 108 to node 104.

From the above, a traffic path 112 is established from node 102 towards 104 using forwarding states represented by MPLS labels in tables 300a, 300b and 300c. As described above, a pathcount field is also kept by each record, such as records 308a, 300b, and 300c, of each tunnelling record table and set to a value of "1" each time a record is created. Thus, after the definition of path 112 records 308a, 308b and 308c will each indicates that that is a single path using the forwarding state information maintained by the records.

Figure 4B:
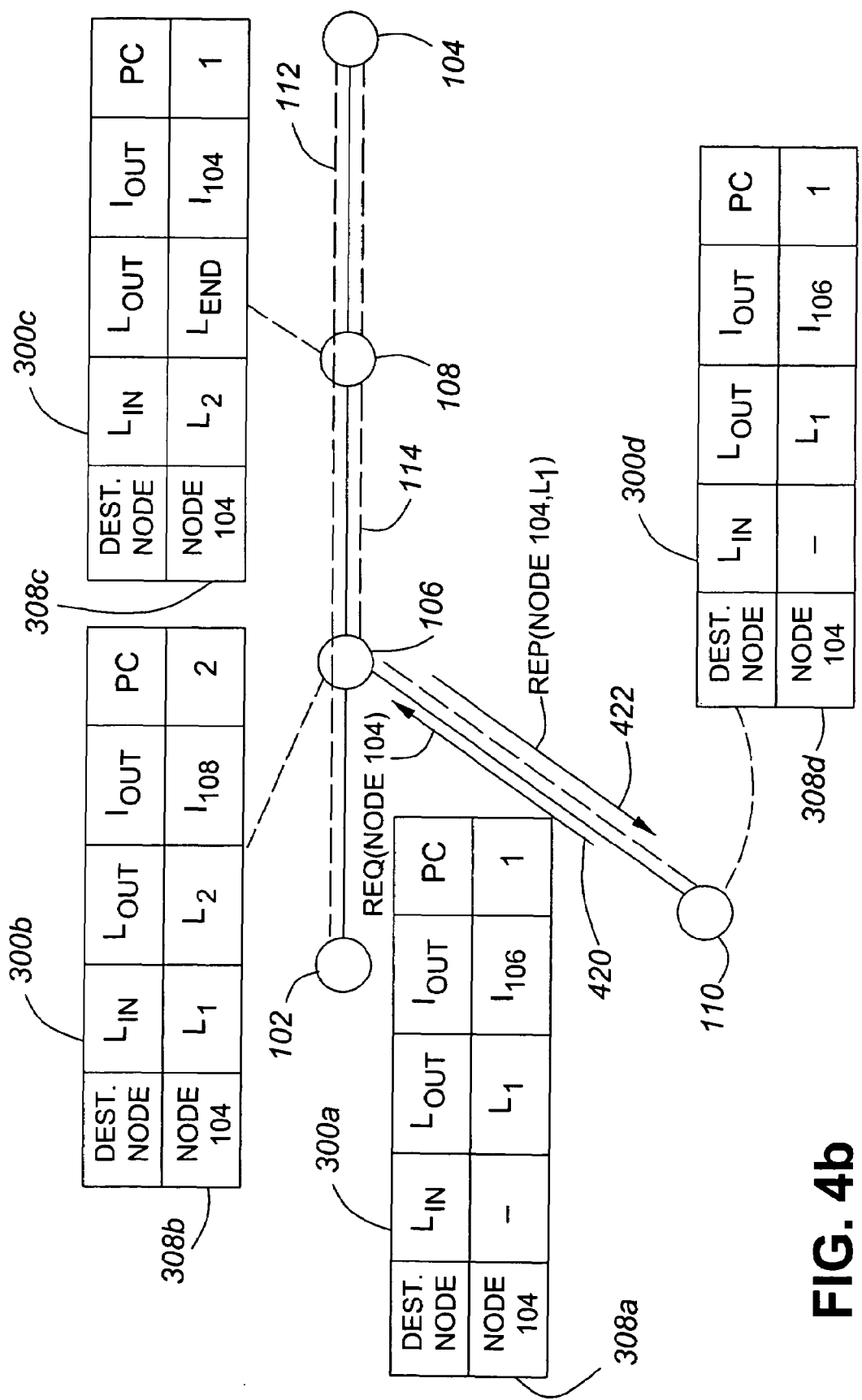

The forwarding states generated for use in communication path 112 may be shared with another communication path as shown in another example with reference to FIG. 4b. Assume that the communication path 112 with the forwarding state information already described is pre-existing, and that node 110 is now requesting that a communication path 114 be established to node 104. Like at node 102, a tunnelling record table 300d associated with node 110 is searched for an entry that identifies in its target field information identifying node 104. Assuming that such an entry is not found, a request 420, shown as Req(node 104), is sent to its child node, which as shown is node 106. Node 106 receives request 420 and examines its table 300b and determines that it has an entry 308b that has information in its target field identifying node 104. Node 106 may also determine if the available path 112 is suitable for sharing with newly requested communication path 114, such as by checking if path 114 has similar or identical quality of service requirements of communication path 112 (which may be indicated by paths 112 and 114 sharing a same FEC) and if communication path 112 permits the sharing of bandwidth. If it is determined that there is a path, such as path 112, that is suitable for sharing forwarding states, then node 106 need not reserve any additional MPLS labels to set up path 114 from node 110 towards node 104, nor does node 106 need to send an additional request to its child node 108 (and in turn, a request from node 108 to node 104) which would require additional MPLS labels. Instead, the label $L_1$ already provided with entry 308b associated with node 106 is retrieved and sent with a response 422, shown as Rep(node 104, $L_1$) to node 110. Entry 308d of table 300d associated with node 110 may then be updated to show $L_1$ as the egress label $L_{out}$, and egress interface field $I_{out}$ is set to select an egress link from node 110 to node 106. Traffic path 114 is completely established because the forwarding states in nodes 106 and 108, or the entries 308b and 308c, are shared and may be used by path 114 towards destination node 104.

Additionally, at node 106 the pathcount field of record 308b is incremented by one to indicated that the downstream forwarding state information of node 106 is being shared. As shown in FIG. 4b, pathcount of record 308b is incremented to "2" to indicate that two paths, path 112 and path 114, are sharing the downstream forwarding state information associated with the record 308b. For the embodiment, the pathcount field of record 308c associated with node 108 is not incremented even as two paths share the forwarding state information of record 308c. Thus, for the embodiment the number of paths sharing downstream forwarding state information is maintained at a "merging" node, such as node 106 for the example shown in FIG. 4b.

Thus, it will be appreciated that even though there are multiple communication paths or LSRs passing through nodes 106 and 108, forwarding states of such nodes may be shared where the communication paths terminate at a common point, such as node 104.

Figure 4C:
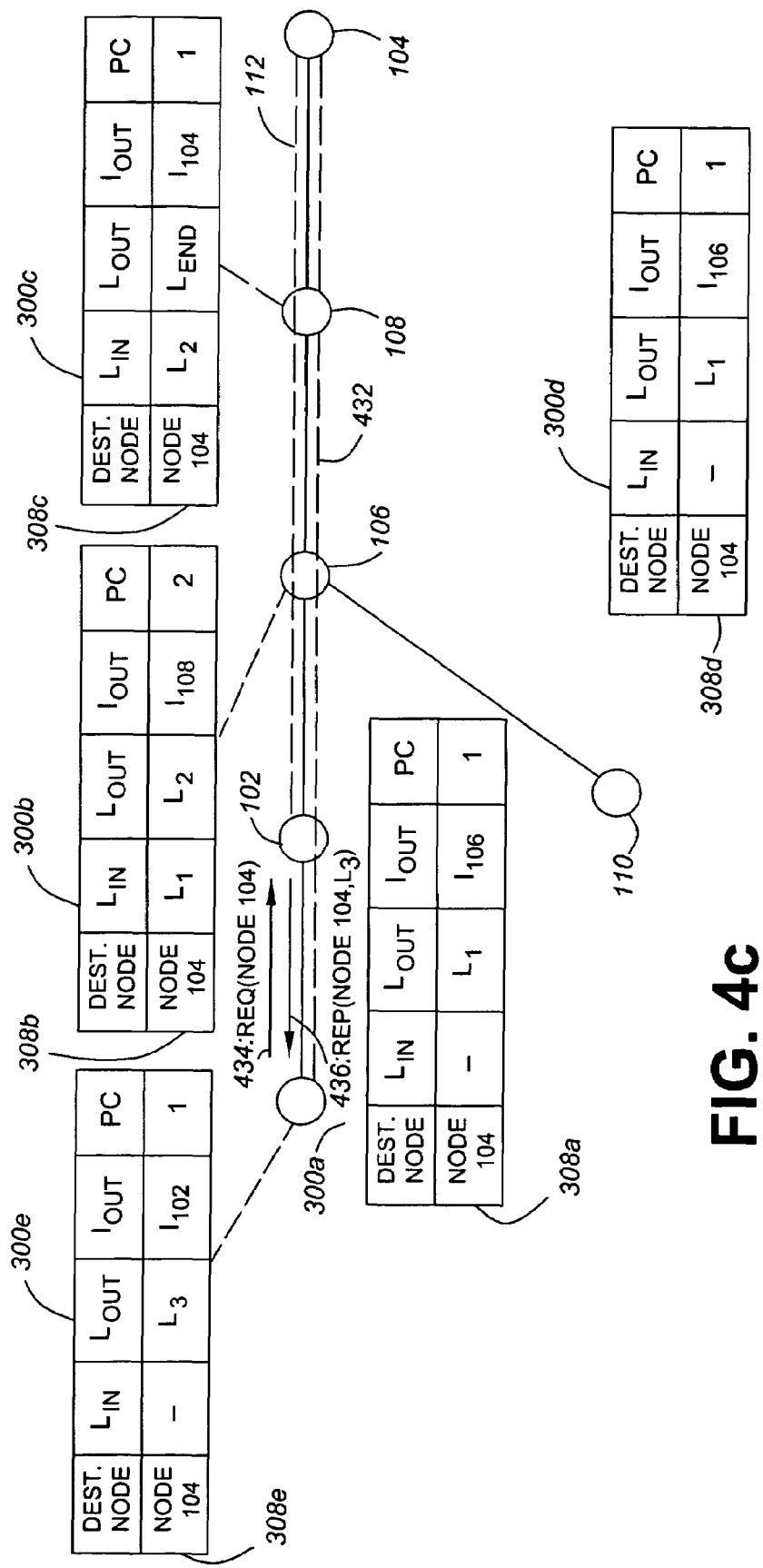

Referring to FIG. 4c, yet another example of forwarding state sharing is provided. Assume now that node 102 is linked to yet another node 430, which requests that a path be established to destination node 104, and assume that the communication paths 112 and 114 are already pre-existing with the same forwarding state information as described above. As node 430 is initiating a request to define a communication path to node 104, a tunnelling record table 300e associated with node 430 is searched for an entry therein which may identify node 104 in its target field information. Assuming that such an entry is not found, a request 434, shown as Req(node 104), is sent to its child node, which is as shown in FIG. 4c is node 102. Node 102 receives request 420 and examines its table 300a and determines that it has an entry 308a that has information in its target field identifying node 104. Optionally, it may also be determined if forwarding states associated with paths 112 and 114 are suitable for sharing. Now, even though there is an entry 308a identifying a path to node 102, the ingress label $L_{in}$ field in entry 308a is unset from before since node 102 is the start node of path 112. As such, to share the forwarding state information in the common "tunnel" to node 104, node 102 must select an unused MPLS label $L_3$ for defining the path requested by node 430. The ingress label field $L_{in}$ of entry 308a in table 300a may then be updated with the label $L_3$. Label $L_3$ is also included in a response 436, shown as Rep(node 104, $L_3$), that is then provided to node 430. Entry 308d is then created in table 300d to insert label $L_3$ into the egress label $L_{out}$ field, and the egress interface field $I_{out}$ is set to select an egress link from node 430 to node 102. Node 102 then also becomes a merging node, at which two or more traffic paths meet and share downstream forwarding states, and hence the pathcount field of record 308a is also incremented to "2" to indicate that downstream forwarding state information associated with record 208a is being shared between two data paths. Thus, it will be appreciated that even though a MPLS label is consumed to define path 434 from node 430 to node 104, three labels are "saved" in this example since labels, or downstream forwarding states, for defining paths between (i) nodes 102 and 106, (ii) nodes 106 and 108, and (iii) nodes 108 and 104, are shared between paths 112, 114 and 432.

The above technique for establishing a traffic path in a communication network towards a destination node may be divided into three major parts:

I: Start Node Processing

After initiating a request for a new path at the start node, the start node first checks its associated tunnelling record table to determine if there is any previously established LSP with end point at the destination node that passes (or originates) at the start node and that is sharable with the new path. This may be done, for example, by simply checking if an entry in the tunnelling record table has information in the target node field that identifies the destination node as described above. If such an entry exists, then this confirms that there is a pre-existing LSR that terminates at the destination node.

If a pre-existing LSP that terminates at the destination node is found, and optionally the pre-existing LSP is also determined to be suitable for sharing downstream forwarding state information, then instead of generating new forwarding state information that would consume additional MPLS labels, the downstream forwarding state, such as MPLS labels of a pre-existing LSP terminating at the destination node, are simply used for the newly requested traffic path, as described above. The establishment of a new connection is then terminated, since a pre-existing path to the destination node with MPLS labels already reserved for that path may be shared with the requested path. The start node is then also identified as a merging node by, for example, incrementing the pathcount field of a record associated with the downstream forwarding state to be shared in a tunnelling record table associated with the start node. It will be appreciated that in other embodiments, a tunnelling record table may also store information about each LSP that is established. Thus, each record, or entry, of a tunnelling record table may also include data fields to identify the start and intermediate nodes of a LSP, and have different table entries recorded in the table for each LSP, and implement forwarding state sharing by copying the label and egress interface information from one entry to another where forwarding state information may be shared between the LSPs associated with the table entries.

However, if a LSP terminating at the destination node is not found, then a path request is sent to a child node, such as the next LSR along the next hop toward the destination node, as described above. The start node may be considered a parent node to the child node. In this respect, each pair of node and its next hop node share a parent-child relationship, which may also be referred to as a upstream-downstream relationship. A parent-child relationship is not static in a network, but is dependant upon a traffic path, or LSP, that is being defined. It will be appreciated that in a path based network such as a MPLS domain, information relating to which nodes or LSRs are in a parent or child relationship to any other node may be provided, for example, by a network information management system. For instance, the parent-child relationship may be derived by the nodes from routing of data in another layer of a network, such as the IP layer. Thus, at any node, given any desired path towards a destination, the node can identify a child node on towards the destination through IP layer routing, and identify a parent node as the node that sends the request to the node. For the embodiment, the child node may be the destination node or an intermediate node along the communication path to the destination node. Information identifying the destination node is carried in the path request, which may be in the form of Req(Dest_Node)

II: Downstream Node Processing of Path Request

If a downstream node receives a path request, such as Req(Dest_Node) from a parent node that identifies the downstream node, then the downstream node is also identified as the destination node and a label $L_{end}$ is selected for a response, such as Rep(Dest_Node, $L_{end}$), that is sent to the parent node. The destination node may also terminate the path establishment process, since at this point MPLS labels along the LSP have been generated to label-switching data packets along the LSR from the start node to the destination node. It will be appreciated that $L_{end}$ is an ingress label associated with the destination node that may be shared among all LSPs, or paths, that terminate at the destination node.

If a downstream node receives a path request Req(Dest_Node) from a parent node which does not identify the node as a destination node, then the downstream node examines a tunnelling record table associated with the child node to determine if there is a record of a LSP that terminates at the destination node identified in the path request.

If the child node finds such a record, the record would contain an egress label-interface pair ($L_{out}$, $I_{out}$), as described above. The record may also have an ingress label $L_{in}$ associated with it, signifying that the child node is along a pre-existing path to the destination node. However, if the record has no ingress label, this would suggest that the record is associated with a pre-existing LSP that commences at the child node and terminates at the destination node. In this case, an unused label $L_c$ may be selected for the child node as the ingress label. The ingress label, either new selected $L_c$ or pre-existing one, is sent in a path response along with information identifying the destination node, such as Rep(Dest_Node, $L_c$) to the parent node. The record in the tunnelling record table of the child node associated with the destination node is also updated with same ingress label $L_c$, and the pathcount field of the record is incremented by one to indicate that the downstream forwarding state information is being shared with one more traffic path. The child node may then terminate the downstream process for path creation, as a path is now configured to the destination node and no further path request needs to be sent to the next hop, or a further child, node.

However, if after receipt of the path request at the child node, there is no record found in the child node's associated tunnelling record table that identifies a pre-existing LSP that terminates at the destination node, then an unused label $L_c$ is selected, and a path response such as Rep(Dest_Node, $L_c$) is generated and sent to the parent node. A record is also created in the tunnelling record table associated with the child node information identifying the destination node, and the label $L_c$ set in the ingress label field of the record. The egress label-interface pair ($L_{out}$, $I_{out}$) in the new record is temporarily left as unset, and the child node sends out a further path request such as Req(Dest_Node) to the next node or LSR on the next hop towards the destination node.

II: Parent Processing of Path Response

When a start node, or a parent node, receives a response such as Rep(Dest_Node, $L_c$) from its child node, certain actions may be taken. If the parent node is also a start node, a new record is created in a tunnelling record table associated with the start node in which the destination node is identified and the ingress label left unset. The new record also has the egress label field set to $L_c$ and has the egress interface field set to select a link from the start node to the child node.

If the parent node is not a start node, then its associated tunnelling record table will already have a record created in association with a traffic path towards the destination node. This record is then updated so that the egress label-interface pair, which was unset after child node processing as discussed above, to be respectively $L_c$ and an outgoing interface from the parent node to the child node.

In both cases of a parent node being a start node or not a start node, an entry may optionally be created in a MPLS label switching table associated with the parent node with the same ingress label and egress label-interface pair information as that the record in the tunnelling record table, for embodiments in which a MPLS label switching table is maintained separately for label switched routing in a MPLS domain.

It will also be appreciated that the selection of an unused label, and the management of a tunnelling record table, may be performed by any network element internal or external to a particular network in which a node under consideration resides, including the node itself or a network information management system.

In other embodiments, forwarding state information may be maintained with reference to each ingress interface of a node or LSR. Such a forwarding state maintenance scheme may be used when a merging node receives requests for a path through different physical links to the node, which links may be associated with different line cards. In such embodiments, label switching information, such as included in a label switched table, may be maintained for each ingress interface of a node, and a centralized set of information relating to traffic paths traversing the node may also be maintained, such as in a tunnelling record table. For such an embodiment, use of MPLS label space may be more efficient, since unique labels are maintained only over a physical connection between network nodes. However, in such embodiments a merging node may not be able to share the same ingress label $L_{in}$ between two traffic paths towards a common destination node. For instance, consider a merging node with first and second ingress interfaces, and which has a first data path towards a common node defined through it, for which a first parent node of the first path is linked to the merging node through the first ingress interface. A label $L_{first}$ would be thus be selected for use in the $L_{in}$ field of a record in a label switching table for the first ingress interface to provide label switching towards the common node. Thereafter, a request to define a second traffic path towards the common node may be received at the merging node through a second physical ingress interface of the merging node from a second parent node. However, the label $L_{first}$ may not be suitable for use in the $L_{in}$ field of the switching table record associated with the second ingress interface, since for instance the label may already be in use on the second ingress interface of the merging node. In this scenario, another unused label such as $L_{second}$ may be selected for the second ingress interface at the merging node in response to the request for the second path towards the common node. This label $L_{second}$ may be set as the ingress label for the second data path at the merging node, and may be provided to the second parent node in a response to the request for the second path. Thus, for such embodiments, the forwarding state that is shared may not include the ingress label at a merging node, and the sharing is of downstream forwarding states of the merging node, including the ($L_{out}$, $I_{out}$) egress label and egress interface pair at the merging node.

In addition to traffic path establishment as described above, in an embodiment there may also be the ability to remove, or "tear-down", traffic paths such as LSPs.

A path tear down request may be issued, for example, when a communication path such as an LSP, is no longer used. Such a path tear down request may be generated, for example, by a network information management system. In an embodiment, a path tear down request includes information identifying the destination node of the path, and is first sent to a start node, and the path tear down process may be divided into (i) start node processing, and (ii) child node processing. An application of these two broad steps is explained below with reference to FIGS. 5a and 5b, in which it is assumed that only communication paths 112 and 114 are defined in network 100, as described above with reference to FIGS. 4a and 4b:

I: Start Node Processing

The start node first identifies the record in its associated tunnelling record associated with the path tear down request, such as by identifying the record in which the target, or destination, node field is identified in the tear down request. The start node then examines the record and determines if it is also a merging node by checking if the pathcount field of this record is two or greater, which for the embodiment would indicate that the downstream forwarding state information is being shared and that the start node is a merging node. If this is the case, then the path tear down request received at the start node would result in decreasing the value of the pathcount field of this record by one, and the tear down request is then complete.

If, however, the start node is not a merging node, such as indicated by the value of the pathcount field of the record being less than two, the tear down request results in the record being deleted from the tunnelling record table. The start node also sends a tear-down request to remove the LSP associated with that destination node to its child node at the start node's next hop towards the destination node. The tear-down request may carry the address of the destination node. In alternate embodiment, the value of the pathcount field may be decremented to zero first, and the deletion of the record may be triggered when the value of pathcount reaches zero.

Figure 5A:
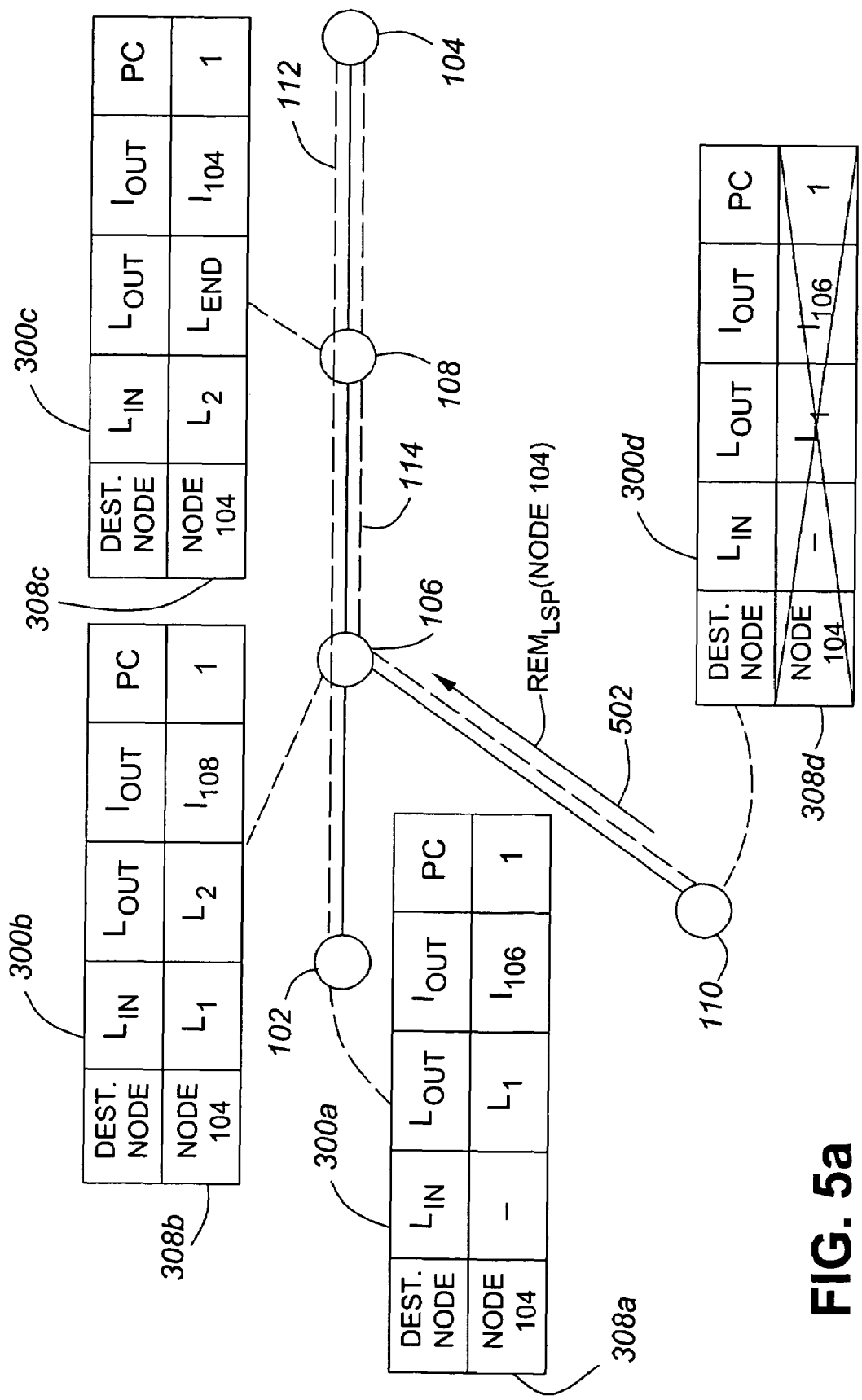
FIG. 5a to 5b are block diagrams showing a tear down of the traffic paths that were established employing the method of FIG. 2 and shown in FIGS. 4a to 4c.

Thus, in the example shown in FIG. 5a, a tear down request may be initiated at node 110. With the request, the record 308d in table 300d associated with node 110 and having a pathcount value of "1", is deleted. Node 110 also sends a request 502, to node 106. Request 502 is shown as $REM_{LSP}$ (Node 104), that carries information identifying destination node 104 of path 114.

II: Child Node Processing

If a child node that receives the tear down request is also the destination node of the LSP, then the path tear down process is complete and the process is terminated. The MPLS label $L_{end}$ may then also be freed for use in the definition of another LSR.

If a child node is not the destination node, then when the child node receives the tear down request, such as $REM_{LSP}$ (Dest_Node) from a parent node, the child node first identifies a record in its associated tunnelling record table that is associated with the destination node identified in the tear down request. It is then determines if the child node is a merging node such that the downstream forwarding state information from the child node towards the identified destination node is being shared with another path. This may be done, for example, by examining if the pathcount variable in the record is greater than 2, as described above with respect to the start node. If the child node is not a merging node, then the child node deletes the record associated with the destination node identified in the tear down request. In an embodiment in which the MPLS label switching is handled by a separate MPLS switching table, the associated entry in such as table may also be deleted. Thereafter, the child node sends a tear down request onto the next hop node towards the destination node. It will be appreciated that after the deletion of a record in a tunnelling record table, the MPLS label specified in the ingress label $L_{in}$ field of the record may be freed to be used in another LSR.

However, if it is determined that downstream forwarding state information is being shared at the node, then the record associated with the destination node identified in the tear down request is modified to decrement the value of pathcount field by one. Optionally, the child node may also determine if the ingress label in the field $L_{in}$ of the record is still being used, such as in the case where the only remaining path(s) sharing downstream forwarding state information starts at the child node so that the label in the field $L_{in}$ may be returned to the pool of unused MPLS labels. The processing of the tear down request is then terminated.

For instance, referring again to FIG. 5a assume that traffic paths 112 and 114 were previously defined as described above with reference to FIGS. 4a and 4b. If node 106 receives a tear down request 502, shown as $REM_{LSP}$(Node 104e), from node 110, node 106 identifies from request 502 that request 502 is for tearing down communication path 114 towards destination node 104. Node 106 then determines if the forwarding state associated with destination node 104, which is stored in entry 308b of table 300b associated with node 106, is being shared with any other communication path towards destination node 104, by examining the pathcount field of record 308b. Since the field show "2" paths are sharing the downstream forwarding state information, the value of the pathcount field in record 308b is decremented by one to the "1", as shown in FIG. 5a.

This would then terminate the processing of the tear down request 502 initiated from node 110. It will be appreciated that communication path 114 is thus torn down with the deletion of entry 308d from table 300d associated with node 110 and the decrement by one of the pathcount field in record 308b of table 300b associated with node 106.

Figure 5B:
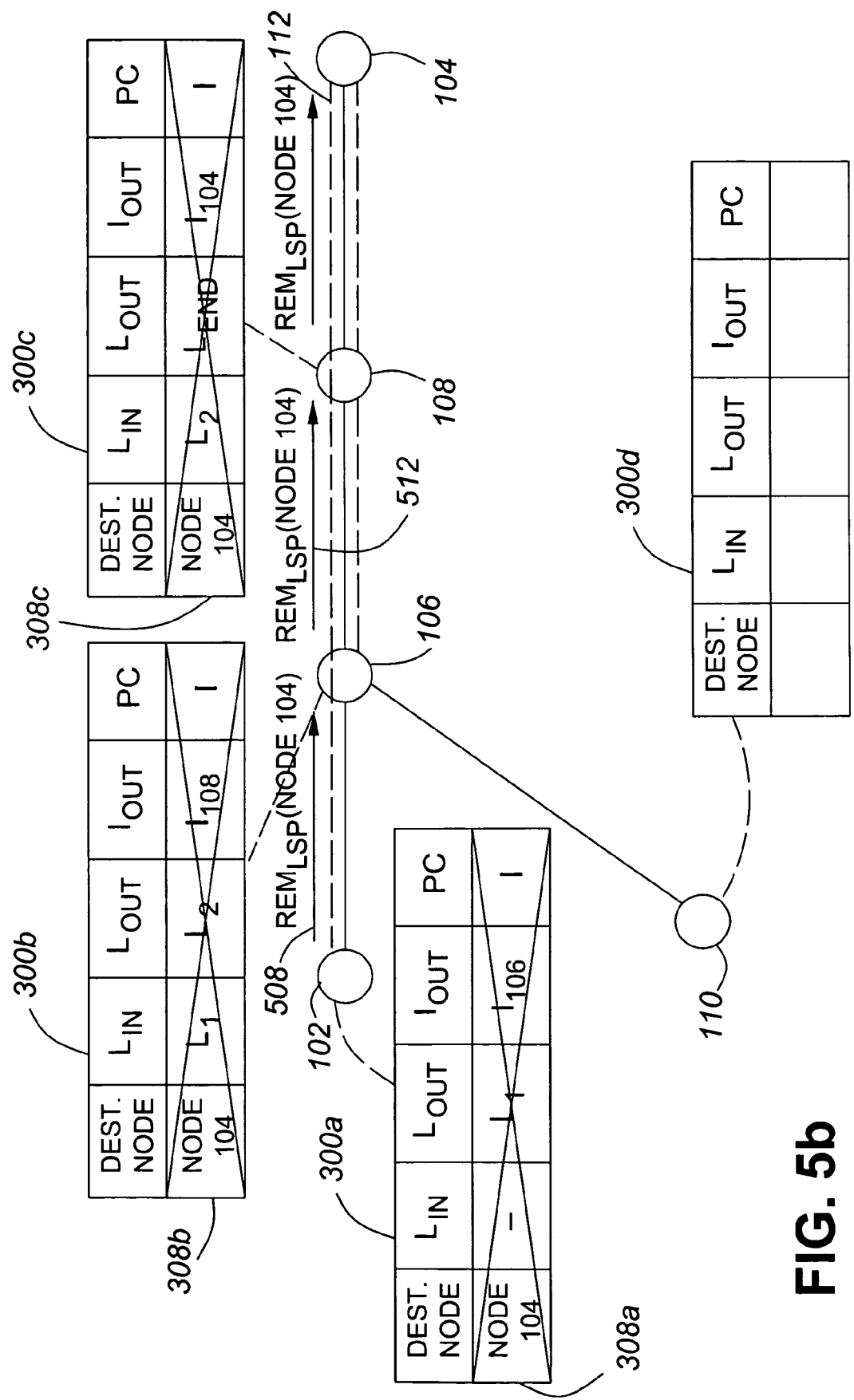

Now, if after communication path 114 is torn down, another request to tear down communication path 112 may be received at node 102 to tear down path 112. Referring to FIG. 5b, when such a tear down request is initiated at node 102, then as described above in step 1, the record 308a is first deleted from table 300a associated with node 102, since the value of the pathcount field is not two or greater. A tear down request 508, shown as $REM_{LSP}$(Node 104), is sent to node 106. Node 106, upon receiving the request 508, determines that the request relates to destination node 104. Node 106 identifies through record 308b that it is also not a merging node, since the pathcount value of record 308b is not two or greater, node 106 then deletes its entry 308b from table 300b, and sends a further path tear down request 512 identifying destination node 104, to its next hop child node towards node 104. As shown in FIG. 5b, this next hop child node is node 108, the request 512 is shown as $REM_{LSP}$(node 104).

Upon receiving request 512, node 108 determines that, in this example, it too is not a merging node as the pathcount value of record 308c is not two or greater. Thus, entry 308c is removed from table 300c, and a further tear down request 516 is sent to the next hop node, or destination node 104.

As described above, since node 104 is the destination node of a path, upon receiving a path tear down request from a parent node, such as request 516 from node 108, no further action is taken and the tear down process of communication path 112 is complete. In this example shown in FIGS. 5a and 5b, after tear down of paths 112 and 114 the MPLS labels $L_1$, $L_2$, $L_3$ and $L_{end}$ may all be freed and returned to the pool of unused labels.

It will be appreciated that other techniques may be used for recording information as to whether a forwarding state at a node is shared among different traffic paths. For instance, in another embodiment, a merging node may keep a list of network identification addresses of parent nodes that share a forwarding state at the merging node.

It will be appreciated that in addition to dynamically generating communication paths with shared forwarding states as described above, in other embodiments there may also be static communication paths with shared forwarding states that is pre-generated in a network implementation. Thus, rather than waiting for requests to generate a path when data is to be routed and tearing down a path when the path is not being used, it is possible for a network operator to statically set up paths with forward state sharing between nodes that are thought to be likely to have communication paths passing through such nodes. It will be appreciated that with static path generation, there tends to be reduced latency for initial data transmission as there is no longer a waiting period for a path to be established, but that resources, such as MPLS labels, may not be freed regularly from communication paths that are not being used. The establishment of static communication paths may be by way of existing LSP setup protocols such as LDP and RSVP.

Further, it will be appreciated that there may be a hybrid implementation in other embodiments in which static and dynamic path generation with forwarding state sharing is available. In such embodiments, there may be some paths that are pre-established with forwarding state sharing between nodes having tunnelling sections that terminate at identical destination nodes which are expected to be commonly share, while other communication paths considered less commonly used are not pre-generated by established and torn down dynamically based on need.

As alluded to earlier, the sharing of forwarding states between communication paths may be considered desirable in network implementations in which there are multicast channels. In such embodiments, forwarding state sharing may tend to increase the deployment scale of the network. For instance, a MPLS network domain having many multicast channels therein may be limited in deployment scale by the number of labels that are available. The sharing of forwarding states, or labels, between different communication paths, be they unicast or multicast, tends to reduce the drain on available forwarding states and hence tends to permit greater network deployment scale.

It will be appreciated that a multicast channel may be created in a network to transmit data from one source node to multiple destination nodes. For example, referring to FIG. 6, a multicast tree 600 is shown for a single multicast channel in a MPLS network. Multicast tree 600 may be considered as the communication path that is taken from start node 602 to the multiple destination nodes of 614, 616, 618, 620 and 630. In multicast tree 600, nodes or LSRs may be classified as: source nodes, from which data typically originates in a data broadcast in a multicast tree (node 602); branching nodes, in which the node has more than one child node (nodes 608 and 612); non-branching nodes, in which the node only has a single child node (nodes 604, 606, 610 and 622); and destination designated nodes, which are also the "leaves" on a multicast tree that is a destination of the multicast channel (nodes 614, 616, 618, 620 and 630).

The generation of a multicast tree, such as tree 600, may be by any number of methods known to one of skill in this art. For example, a centralized network information management system (CNIMS, not shown) may be used to compute multicast trees in a MPLS network. A CNIMS may collect information about a particular network layout and channel membership (either unicast or multicast) of each node or LSR. After collecting membership information for a channel, the CNIMS may compute the multicast tree for that channel in the network. By having a complete overview of the network and multicast trees, CNIMS may use a multicast tree construction algorithm known to one of skill in this art, such as Shortest Path Tree or Steiner Tree, to discover branching nodes and corresponding next hop branching nodes and destination designated nodes for each node in a channel or tree. For example, for tree 600 shown in FIG. 6, CNIMS may be used to determine that (i) node 608 is a next hop branching node of node 602 and that node 612 is a next hop branching node of node 608, and (ii) nodes 614 and 616 are next hop destination designated nodes of node 608, node 618 is a next hop destination designated node of node 602, and that nodes 620 and 630 are next hop destination designated node of node 612 and 622, respectively. Thus, the "next hop" analysis skips over a non-branching node until either a branching node or a destination designated router is identified along a traffic path.

In an embodiment, data such as data packets are only duplicated at a branching node on a multicast tree for continued transmission of the data along the multiple branches after the branching node towards the leaves. Using forwarding state sharing as described above, it is possible to share forwarding state information between different multicast trees in a MPLS network to reduce the forwarding states, or the consumption of MPLS labels, in the MPLS network. In an embodiment this may be accomplished by generating sharable forwarding states for communication paths, or LSP tunnels, that terminate at a branching node or a destination node of a multicast tree, and having multicast traffic arranged to be forwarded by label switched forwarding towards a next hop branching node or a next hop destination designated node.

Figure 6:
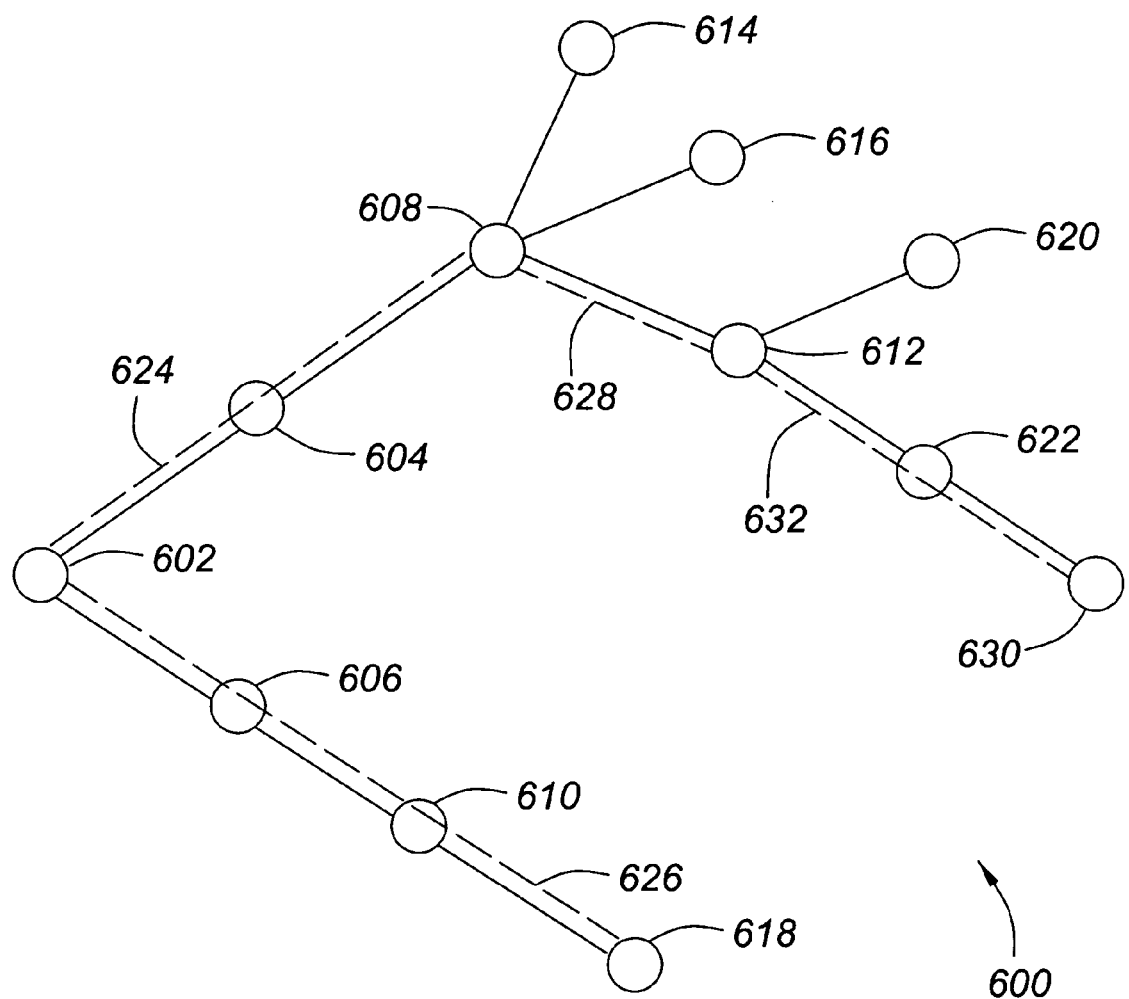
FIG. 6 is a block diagram of a multicast tree for a multicast channel through which traffic paths, or traffic tunnels, may be established according to the method of FIG. 2 in an alternate embodiment of the present invention.

For instance, with respect to multicast tree 600 shown in FIG. 6, instead of creating traffic paths directly from start node 602 to each of the destination designated nodes 614, 616, 618, 620, 622 and 630, LSP tunnels may be set up between the source node, next hop branching routers, and destination designated nodes. Thus, tunnel 624 may be established between node 602 and 608 (a source node to next hop branching node tunnel); tunnel 626 may be established between node 602 and 618 (a source to next hop destination designated node tunnel); tunnel 628 may be established between nodes 608 and 612 (a branching node to next hop branching node tunnel); and tunnel 632 may be established between nodes 612 and 630 (a branching node to next hop destination designated node tunnel). It will be appreciated that other tunnels to destination designated nodes 614, 616 and 620 may also be established. To implement forwarding state sharing with another multicast tree, LSP tunnels 624, 626, 628 and 632 may be dynamically or statically established, as described above, but with (i) the start node being the source node 602 or a branching node 608, 612; and (ii) the next hop branching node or the next hop destination designated node being the "destination node" in the path generation request, such as Req(Dest_Node) describe above. Thus, despite the multiple destinations of multicast tree 600, component point-to-point "tunnels" between nodes may be defined, which point-to-point tunnels are substantially identical to communication paths 112 and 114 described above with respect to FIGS. 4a, 4b, 4c, 5a and 5b. Thus, where another multicast tree (not shown) for another multicast channel exists in the same MPLS network implementation, the other trees will also have next hop branching nodes or next hop destination designated nodes and tunnels to such nodes. In the creation of such tunnels for the other trees, where (i) a next hop branching node or a next hop destination node of the other tree is also (ii) a next hop branching node or next hop destination node of tree 600, forwarding state information may be shared between the tunnels of each tree, in the same manner as described above and in particular with the example of communication paths 112 and 114 described above with reference to FIGS. 4a, 4b, 4c, 5a and 5b. It will be appreciated that, as with paths 112 and 114, forwarding states may be shared irrespective of the start node of tunnels so long as the tunnels of different multicast trees terminate at the same node that is a next hop branching or destination designated node of each respective tunnel.

The establishment of LSP tunnels may also be done statically, as describe above. It will be appreciated that in some applications, the use of multicast channels in a MPLS network may be for the broadcasting of information such as multimedia. In such use, the data traffic pattern may be predominately one directional, from a few source nodes (such as multimedia content providers) to many destination designated nodes (such as end-users or customers of the content providers). In such situations, forwarding state sharing between different multicast channels may be very compelling since the set of source and destination designated nodes of each multicast channels is very similar such that many next hop branching nodes and next hop destination designated nodes are identical for multicast trees of the multicast channels. Furthermore, since in some MPLS applications bandwidth is also reserved along with label reservations, in situations for which similar quality of service is required for different multicast channels, the sharing of forwarding states in the manner described also reserves similar bandwidth for use by the different multicast channels. Still further, for such multicast channels, it may also be more desirable to use static LSP tunnel establishment, since the set of source and destination designated nodes for each channel may be very similar and hence there is a high degree of confidence that only very few static LSP tunnels will be unused.

In an embodiment for the static establishment of LSP tunnels, a decision as to establishing tunnels between nodes may be made by way of a shortest path multicast. Using this scheme, all nodes in a network are divided into edge nodes and core nodes. Only edge nodes may be a source node or destination designated node for a multicast tree. Thus, core nodes are non-branching nodes or branching nodes. Referring to FIG. 7, an exemplary set of nodes 700 having edge nodes E1, E2, E3 and E4, and core nodes R1, R2, R3, R4 and R5 is shown.

Given the set of nodes 700, a network management device such as a CNIMS may compute a set of static tunnelling LSPs using a rule for shortest path mutlicast:

Rule 1: A static LSP tunnel is established from an edge router ER to another router R (edge or core) on the shortest path between them only if:
 a. R is on the shortest path from the edge router to any other edge router; and
 b. R is either:
  (i) a core router with more than 2 outgoing links (i.e., more than 2 degrees); or
  (ii) an edge router.

Thus, for the set of nodes 700, the set of shortest edge to edge paths is determined as:

E1<->R4<->R3<->R5<->E2
E1<->R4<->R2<->E4
E1<->R1<->E3
E3<->R1<->R2<->E4
E3<->R1<->R2<->R3<->R5<->E2
E2<->R5<->R3<->R2<->E4

Additionally, a set of 30 static LSP tunnels may be established according to Rule 1 above, as shown on FIG. 7. As described above, static LSP tunnels may be established by using any LSP setup protocol known to one of skill in this art, such as LDP and RSVP, and the forwarding state information for each static LSP tunnel recorded in a tunnelling record table associated with a LSR in the path of the tunnel. In some embodiments, no dynamic LSP tunnels will need to be established for an implementation of shortest path multicast trees in which all LSP tunnels are pre-generated using the above method. As described above, it will be appreciated that a hybrid system, in which some LSP tunnels are static and other LSP tunnels are dynamic, may be implemented in other embodiments where static LSP tunnels are pre-established on some paths used frequently by multi-cast trees, and other paths that that do not have static LSP tunnels pre-established will dynamic establish LSP tunnels when demanded by multi-cast traffic in one or more channels.

Figure 8:
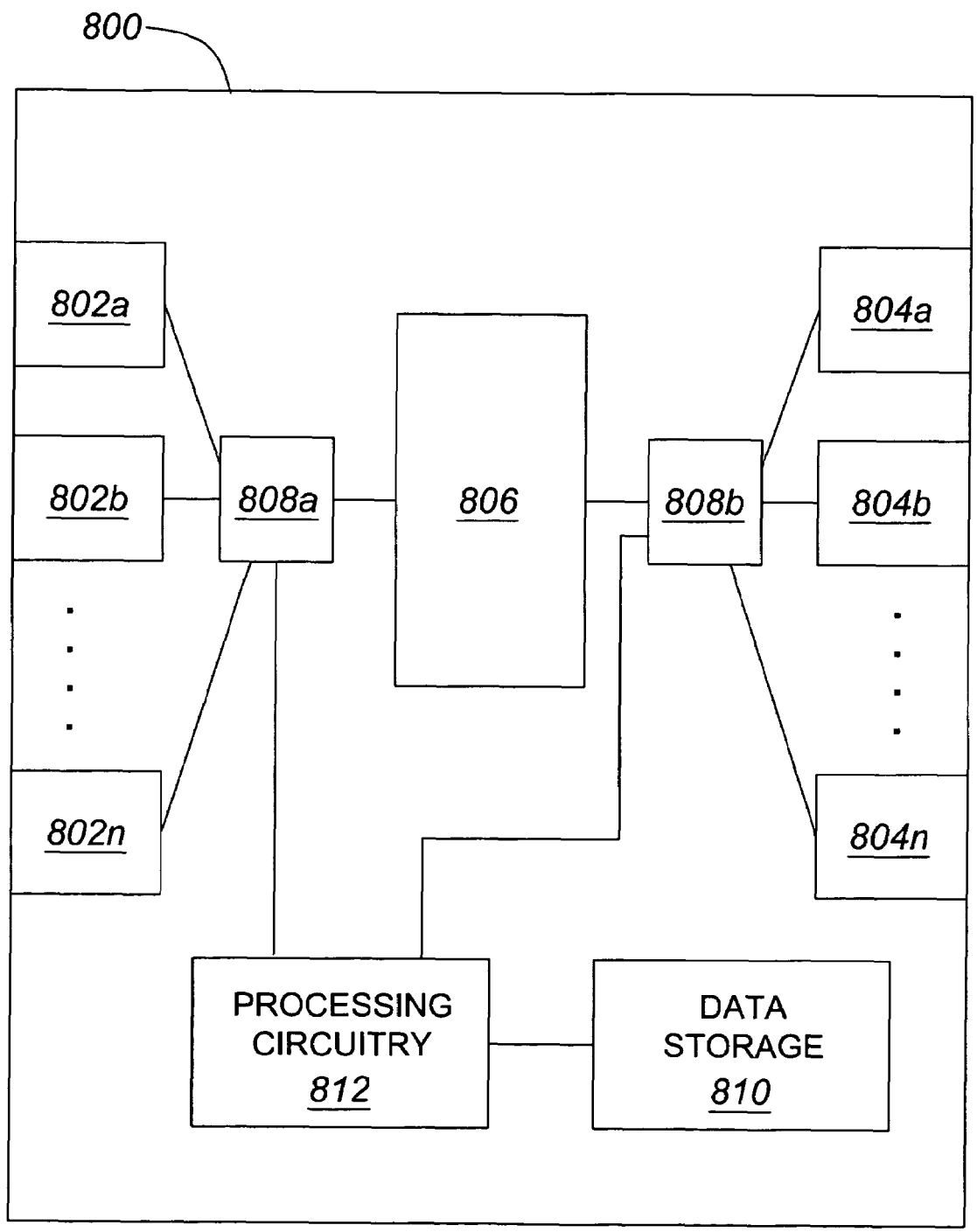
FIG. 8 is a block diagram of a network element that may be used in an embodiment of the invention.

Referring to FIG. 8, there is shown a block diagram of a network element 800 that may be used as a router for a MPLS enabled network. Router 800 includes one or more ingress interfaces 802 interconnected to one or more egress interfaces 804 through interconnection(s) 806 for connecting to parent and child nodes, as described above. Router 800 also includes label switching circuitry 808 for reading MPLS labels in incoming data traffic received from ingress interface(s) 802 and performing label path switching. Label switching circuitry 808 may be distributed among one or more line cards connected to ingress interfaces 802 and egress interface 804. Router 800 may also provide a centralized processing circuit 812 that performs path setup and teardown, and manages distributed switching tables that may be implemented at each line card. For an embodiment, router 800 further includes data storage 810, such as RAM or other data storage as would be known to one of skill in this art. Storage 810 is accessible by processing circuitry 808 and may provide read and write access for data, such as records in a tunnelling record table, to processing circuitry 812 for the definition of traffic paths. It will be appreciated that switching circuitry 808, such as a line card, may also have data storage to keep its label switching information, such as switching tables, for data routing. In other embodiments, a router may also include communication ports to a network information management system (not shown). It will be appreciated that network elements may be used to implement other embodiments.

Although the invention has been described with reference to certain specific embodiments, various modifications thereof will be apparent to those skilled in the art without department from the scope of the invention as outlined in the claims appended hereto.

We claim:

1. A method of establishing a tunneling Multi-Protocol Label Switched Path (LSP) between nodes in a multicast network, the method comprising:
 receiving an instruction to establish a first path from a source node in a first multicast tree to a destination node in the first multicast tree, the first path including a connection between a branching node and a next hop branching node;
 establishing an LSP extending from the branching node to the next hop branching node by performing the following steps:
  determining a next hop toward the next hop branching node,
 wherein the next hop is an intermediate node between the branching node and the next hop branching node,
  sending an LSP path request to the next hop,
  receiving the request at the next hop,
  selecting an ingress label for the LSP at the next hop wherein the ingress label is selected by performing the following steps:
   when a second LSP terminating at the next hop branching node and traveling through the next hop exists, selecting a previously assigned ingress label for the second LSP as the ingress label, and
   when a second LSP terminating at the next hop branching node and traveling through the next hop does not exist, selecting an unused ingress label as the ingress label, and sending a reply from the next hop, the reply specifying the ingress label and the identification of the next hop branching node;
 storing, at the branching node, tunneling information regarding the LSP, the tunneling information including an identification of the next hop branching node;
 receiving an instruction to establish a second path from a source node in a second multicast tree to a destination node in the second multicast tree;
 determining whether the second path shares the connection between the branching node and the next hop branching node using the identification of the next hop branching node included in the tunneling information; and
 when it is determined that the second path shares the connection between the branching node and the next hop branching node, using the LSP as part of the second path, whereby forwarding states are shared between the first multicast tree and the second multicast tree.

2. The method of claim 1, wherein the tunneling information stored at the branching node further comprises at least one of an ingress label, an egress label, and an output interface.

3. The method of claim 1, wherein the tunneling information stored at the branching node further comprises a path count field indicating the number of paths that share the connection from the branching node to the next hop branching node.

4. The method of claim 3, wherein, when it is determined that the second path shares the connection between the branching node and the next hop branching node, incrementing the path count field by one.

5. The method of claim 1, further comprising
upon receipt of a request to tear down a path including the connection from the branching node to the next hop branching node, determining the value of the path count field;
when it is determined that the path count field is greater than one, decrementing the path count field by one; and
when it is determined that the path count field is one, removing the tunneling information from the branching node.

6. The method of claim 1, further comprising:
when it is determined that the second path shares the connection between the branching node and the next hop branching node, determining whether the connection is suitable for sharing prior to using the LSP as part of the second path.

7. The method of claim 6, wherein the step of determining whether the connection is suitable for sharing comprises determining whether the first path and second path have similar or identical quality of service requirements.

8. The method of claim 7, wherein the quality of service requirements are specified by a Forwarding Equivalence Class (FEC).

9. A network element for establishing a tunneling Multi-Protocol Label Switched Path (LSP) between network elements in a multicast network, the network element comprising:
data storage containing tunneling information regarding LSPs used for routing of data by the network element; and
circuitry adapted to:
receive an instruction to establish a portion of a first path from a source node in a first multicast tree to a destination node in the first multicast tree, the first path including a connection between the network element and a next hop branching network element;
establish an LSP extending from the network element to the next hop branching network element, the circuitry being further adapted to:
determine a next hop network element toward the next hop branching network element, wherein the next hop network element is located between the network element and the next bop branching network element,
send an LSP path request to the next hop network element,
receive the request at the next hop network element,
select an ingress label for the LSP at the next hop network element, the circuitry being further adapted to:
when a second LSP terminating at the next hop branching node and traveling through the next hop exists, select a previously assigned ingress label for the second LSP as the ingress label, and
when a second LSP terminating at the next hop branching node and traveling through the next hop does not exist, select an unused ingress label as the ingress label, and
send a reply from the next hop network element, the reply specifying the ingress label and the identification of the next hop branching network element;
store an identification of the next hop branching network element in the tunneling information contained in the data storage;
receive an instruction to establish a portion of a second path from a source node in a second multicast tree to a destination node in the second multicast tree;
determine whether the second path shares the connection between the network element and the next hop branching network element using the identification of the next hop branching network element included in the tunneling information; and
when it is determined that the second path shares the connection between the network element and the next hop branching network element, use the LSP as part of the second path, whereby forwarding states are shared between the first multicast tree and the second multicast tree.

10. The network element of claim 9, wherein the tunneling information further comprises at least one of an ingress label, an egress label, and an output interface.

11. The network element of claim 9, wherein the tunneling information further comprises a path count field indicating the number of paths that share the connection from the network element to the next hop branching network element.

12. The network element of claim 11, wherein, when the circuitry determines that the second path shares the connection between the network element and the next hop branching network element, incrementing the path count field by one.

13. The network element of claim 9, wherein the circuitry is further adapted to:
upon receipt of a request to tear down a path including the connection from the network element to the next hop branching network element, determine the value of the path count field;
when it is determined that the path count field is greater than one, decrement the path count field by one; and
when it is determined that the path count field is one, remove the tunneling information from the network element.

14. The network element of claim 9, wherein the circuitry is further adapted to:
when it is determined that the second path shares the connection between the network element and the next hop branching network element, determine whether the connection is suitable for sharing prior to using the LSP as part of the second path.

15. The network element of claim 14, wherein the determination whether the connection is suitable for sharing comprises determining whether the first path and second path have similar or identical quality of service requirements.

16. The network element of claim 15, wherein the quality of service requirements are specified by a Forwarding Equivalence Class (FEC).

17. A method of establishing a tunneling Multi-Protocol Label Switched Path (LSP) between nodes in a multicast network, the method comprising:

establishing a plurality of LSPs by performing the steps of:
  designating each router in the network as either an edge router (ER) or a core router (CR), and
  establishing a LSP between a first ER and a subject router only when:
    the subject router is either an ER or a CR having more than two outgoing links to routers in the multicast network, and
    the subject router is on the shortest path between the first ER and a second ER; receiving an instruction to establish a first path from a source node in a first multicast tree to a destination node in the first multicast tree, the first path including a connection between a branching node and a next hop branching node;
  storing, at the branching node, tunneling information regarding one of the plurality of LSPs, the tunneling information including an identification of the next hop branching node;
  receiving an instruction to establish a second path from a source node in a second multicast tree to a destination node in the second multicast tree;
  determining whether the second path shares the connection between the branching node and the next hop branching node using the identification of the next hop branching node included in the tunneling information; and
  when it is determined that the second path shares the connection between the branching node and the next hop branching node, using the one of the plurality of LSPs as part of the second path, whereby forwarding states are shared between the first multicast tree and the second multicast tree.

18. The method of claim 17, wherein the plurality of LSPs is established by a central network management device.

19. A system for establishing a tunneling Multi-Protocol Label Switched Path (LSP) between network elements in a multicast network, the system comprising:
  a network management device adapted to establish a plurality of LSPs by executing instructions adapted to:
    designate each router in the network as either an edge router (ER) or a core router (CR), and
    establish an LSP between a first ER and a subject router only when:
      the subject router is either an ER or a CR having more than two outgoing links to routers in the multicast network, and
      the subject router is on the shortest path between the first ER and a second ER; and
  a network node comprising:
    data storage containing tunneling information regarding LSPs used for routing of data by the network element, and
    circuitry adapted to:
      receive an instruction to establish a portion of a first path from a source node in a first multicast tree to a destination node in the first multicast tree, the first path including a connection between the network element and a next hop branching network element,
      select one of the plurality of LSPs extending from the network element to the next hop branching network element,
      store an identification of the next hop branching network element in the tunneling information contained in the data storage,
      receive an instruction to establish a portion of a second path from a source node in a second multicast tree to a destination node in the second multicast tree,
      determine whether the second path shares the connection between the network element and the next hop branching network element using the identification of the next hop branching network element included in the tunneling information, and
      when it is determined that the second path shares the connection between the network element and the next hop branching network element, use the one of the plurality of LSPs as part of the second path, whereby forwarding states are shared between the first multicast tree and the second multicast tree.

* * * * *